United States Patent [19]

Cholin

[11] 4,241,258
[45] Dec. 23, 1980

[54] ULTRAVIOLET FIRE DETECTOR

[75] Inventor: John M. Cholin, Hackensack, N.J.

[73] Assignee: Firetek Corporation, Hawthorne, N.J.

[21] Appl. No.: 968,132

[22] Filed: Dec. 11, 1978

[51] Int. Cl.³ ............................................. G01J 1/42
[52] U.S. Cl. ................................. 250/372; 250/461 R
[58] Field of Search .............. 250/370, 372, 458, 461; 340/577

[56] References Cited

U.S. PATENT DOCUMENTS

| | | | |
|---|---|---|---|
| 3,609,364 | 2/1970 | Proffit | 250/372 |
| 3,643,093 | 2/1972 | Dietz | 250/372 |
| 3,891,849 | 6/1975 | Felice et al. | 250/372 |
| 4,015,130 | 3/1977 | Landry et al. | 250/372 |
| 4,096,387 | 6/1978 | Buckley | 250/372 |

Primary Examiner—Bruce C. Anderson
Attorney, Agent, or Firm—James J. Cannon; W. Patrick Quast

[57] ABSTRACT

An ultraviolet fire detection device using a phosphor to translate energy from ultraviolet wavelengths down into visible and near infrared wavelengths for detection by a photosensitive solid state device, sounding an alarm upon detection of ultraviolet wavelengths associated with flames. In one embodiment has two windows, a reference window being opaque to ultraviolet wavelengths. In the second embodiment, a prism or diffraction grating is used to separate the light source into its various wavelengths.

16 Claims, 3 Drawing Figures

ULTRAVIOLET FIRE DETECTOR

BACKGROUND OF THE INVENTION

1. Field of the Invention

This invention pertains an ultraviolet fire detection device for detecting fires which uses a phosphor to translate energy from ultraviolet wavelengths down into visible and near infrared wavelengths for detection by a photo-sensitive solid state device which can sound an alarm upon detection of the ultraviolet wavelengths associated with flames. In one embodiment a two window approach is used, the reference window being opaque to ultraviolet wavelengths. In the second embodiment, a prism or diffraction grating is used to separate the light source into its various wavelengths.

2. Description of the Prior Art

In the present state of the art, electro-optical sensing devices, such as silicon solar cells (photovoltaic cells), cadmium selenide and the like are not responsive to light in the ultraviolet region of the spectrum. Those photo-sensitive cells which are enhanced to be sensitive to ultraviolet wave-lengths are also extremely sensitive to emissions in the visible and infrared ends of the spectrum and thus lack the capability of discriminating ultraviolet emissions. Hence, there are no solid state electro-optical devices which can serve as ultraviolet detectors in fire detection devices.

In the present state of the art in ultraviolet fire detection devices, photodiodes are used for detection of ultraviolet light. The vacuum photodiode is essentially a vacuum tube with cesium sulfide or some other cesium salt in it, and it is operated at a very high voltage (from 200 to 300 volts). When a photon enters the quartz envelope of the photodiode, it causes an ionic avalanche of current between the two electrodes of the photodiode. This current is then passed through a resistor which creates a voltage drop. The voltage drop is then amplified and converted into a detection signal.

Photodiodes present many problems in fire detection systems. As vacuum tubes, they are somewhat unreliable. An ultraviolet fire detector must be able to operate under a wide range of temperature extremes. Quartz-enveloped photodiodes are not rugged and cannot withstand temperature extremes. They are susceptible to static electricity, even small amounts. They are too sensitive and will respond to lightening, arc welding and similar phenomena, thus causing false alarms. Because of these problems, a fire detection system using photodiodes must include an elaborate test and diagnostic procedure to be performed regularly to discover devices whose photodiodes have failed. The reliability of a tube degrades raidly because of the loss of hermiticity. When the tube fails, there is no indication of failure from the detector. As the tube loses its vacuum over time, it becomes less and less sensitive. Even though it works with a test lamp, it can be so insensitive as to be useless.

To solve the problems of present ultraviolet fire detection systems, the present invention provides a solid state detection system which eliminates the inherent unreliability of the photodiode vacuum tube and provides a means to translate ultraviolet wavelengths of light to visible wavelengths which can be easily detected by photo-sensitive solid state devices. One can make the photodiode sensitive to any desired frequency from 200 nanometers to 1500 nanometers by adjusting the voltage across the diode and adjusting jthe phosphor element inside the photodiode. The frequency is inversely proportional to the wavelength; the higher the frequency, the higher the energy and the shorter the wavelength. Silicon photovoltaic cells are available which are responsive from 300 to 1000 nanometers. Sunlight is filtered out at 280 nanometers by the ozone layer which acts as a low-pass filter. This layer filters out ultraviolet radiation above 280 nanometers. Thus, if a photosensitive solid state device such as a silicon photovoltaic cell is responsive to 300 nanometers and lower in frequency or from 300 nanometers to 1500 nanometers in wavelength, then the cell is responsive to sunlight. If the cell were used in a fire detection system, the sunlight would be a source of false alarms. To overcome this problem, the present invention utilizes a hosphor layer in conjunction with a solid state photosensitive device, the phosphor serving to translate the wavelength of the ultraviolet radiation into a longer wavelength which can be reliably detected by a photosensitive solid state device.

Various phosphors are available which will fluoresce when exposed to ultraviolet radiation, which has wavelengths shorter than 280 nanometers. In particular one phosphor fluoresces from 210 to 290 nanometers, which is an acceptable range for ultraviolet fire detectors. The phosphor receives an ultraviolet photon which has a relatively high energy and captures it in its crystal structure. The phosphor removes some of the energy and reemits the photon. The reemitted photon, having less energy comes out at a different wavelength of light. The energy surplus is dissipated in the crystal as heat. The phosphor receives irradiation in the ultraviolet range and will glow with a yellow-green color, even though the ultraviolet radiation is imperceptible. The wavelength of light emitted from the fluoresced phosphor is sufficiently long enough to be detected by a solid state photosensitive or photodetection device. Thus, the phosphor translates ultraviolet light in the 220 nanometer range to a yellow light which is in the 580 nanometer range. This latter range is in the middle of the response curve for some silicon photovoltaic cells which are very responsive to light in this color range. Thus, the photovoltaic cell can be made responsive through this translation of the ultraviolet light in the 220 nanometer range to a yellow light in the 580 nanometer range, even though the photosensitive device is not responsive to the untranslated ultraviolet light. Thus, using a phosphor as a wavelength translation means, one can characterize the general band of wavelengths desired, for example, the ultraviolet energy emitted from a flame.

The present invention provides two embodiments which use the ultraviolet wavelength translation phenomenen discussed above in solid state ultraviolet fire detectors. In the first embodiment, two windows are utilized, one of glass and one of quartz. Glass is used in the reference window because it is opaque to ultraviolet radiation. A layer of phosphor is deposited behind the both windows. A photosensitive device is positioned behind each window. The outputs of the photosensitive devices are compared in an operational amplifier. In the presence of normal ambient light, sunlight or artificial illumination, both photo-sensitive cells will detect the same amount of light energy, both outputs are the same, and no alarm will be sounded. However, if there is a flame in the environment, the ultraviolet radiation from the flame will pass through the quartz window, cause the phosphor to fluoresce and cause the resulting yellow light to be detected by the photosensitive cell behind the quartz window. At the same time, the glass window which is opaque to ultraviolet radiation will not permit the phosphor behind it to fluoresce, but will detect only the ambient light in the environment. Hence, the glass window and its phosphor layer will cause its photosensitive cell to send a reference signal relative to the ambient light to the operational amplifier. Since the photosensitive cell behind the quartz window will detect both the ambient light and the yellow light from the fluorescent phosphor, this photo-sensitive cell will send a different signal with a greater output to the operational amplifier. The operational amplifier will then cause an alarm.

In the second embodiment, phosphor is also used as the ultraviolet wavelength translation medium. In this embodiment, a quartz prism or diffraction medium is used to separate the wavelengths of light and to project them on a phosphor coated screen. A photosensitive cell positioned behind the screen will detect the fluorescence of the phosphor in the presence of ultraviolet radiation and its output will then exceed a threshold level, causing an alarm to sound. Using a plurality of cells behind a plurality of locations on the prism or diffraction medium, the photosensitive detectors can detect various selected wavelengths of light and thus distinguish between different types of fires such as a hydrogen fire, a butane fire or a propane fire. The fire detection device can be further utilized to select the appropriate extinguishing agent for the type of fire detected.

In all embodiments, the invention used solid state photosensitive devices to detect ultraviolet light of specific frequencies by using a phosphor to translate the wavelength of the ultraviolet radiation to a wavelength in the response range of the photosensitive device. Changes in basic ambient light are ignored by use of a reference cell. When ultraviolet light is present in the spectrum, that light impinging on the quartz sampling cell will be enhanced by the emissions from the phosphor, this enhancement providing a greater output causing the operational amplifier to sound an alarm.

DESCRIPTION OF THE PREFERRED EMBODIMENTS

Figure 1:
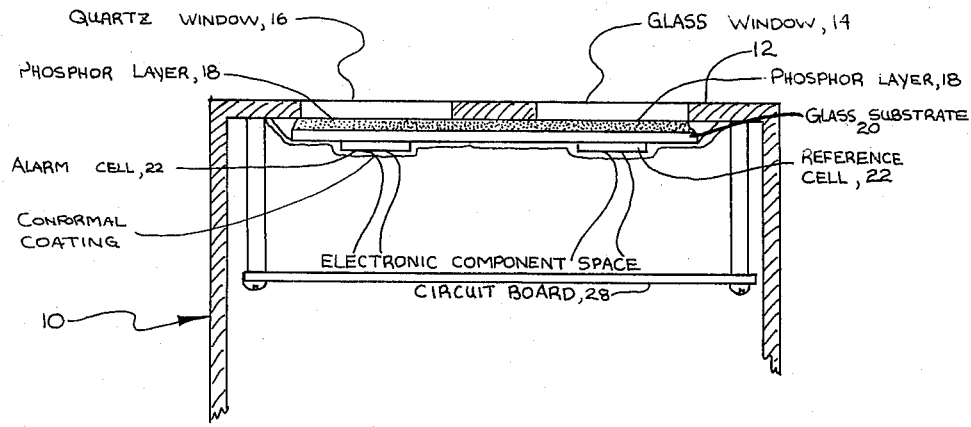
FIG. 1 is a cross-sectional view of an ultraviolet fire detection device incorporating the principles of the present invention.

Referring now to the drawings, FIG. 1 is a cross-sectional view of an ultraviolet fire detection device 10 using the principles of the present invention. Fire detection device 10 includes a housing 12 which has two windows 14, 16 located in close proximity to one another on one of its sides which normally would be exposed to the fire hazard area to be protected. For purposes of exposition, these windows are illustrated and described on the top of housing 12. Window 12 is a glass window which will permit penetration of all ambient light but is opaque to ultraviolet wavelengths. Window 16 is a quartz window which will permit the penetration of all ambient light and ultraviolet radiation. Glass and quartz are used in the preferred embodiment, but any other substances having similar properties may be used. Glass window 14 and quartz window 16 are coated on their interior sides with equal layers 18 of phosphor. Alternatively, a glass substrate 20 coated with a layer 18 of phosphor facing the interior side of each of windows 14, 16 may be used, as shown in FIG. 1. In either case, the phosphor layer 18 behind windows 14, 16 should be identical in thickness. In tests conducted by applicant Sylvania phosphor 2283 fluoresced between 210 to 290 nanometers, which is an acceptable range for ultraviolet fire detectors. When exposed to ultraviolet radiation, this phosphor glows with a yellowish green light having a wavelength of about 580 nanometers, which is in the middle of the response curve for some commercially available silicon photovoltaic cells. However, any phosphor which fluoresces when exposed to ultraviolet light and emits a light having a wavelength in the range of a photosensitive solid state device may be utilized. Any phosphor 18 which will fluoresce only when irradiated by ultraviolet light may be utilized. The detector 10 uses the phosphor layer 18 to select the wavelength of light to be sensed as indicative of a fire hazard. Identical photosensitive devices 22, 24 are placed behind the glass window 14 and the quartz window 16 respectively. Photosensitive devices 22, 24 may be silicon photovoltaic cells, cadmium selenide cells or any similar photosensitive solid state device which is responsive to light in the visible wavelengths. The only constraint on photosensitive cells 22, 24 is that they not be extremely sensitive to wavelengths at the extreme ends of the spectrum because this could be a cause of false alarms in the fire detector 10. Both photosensitive cells 22, 24 are connected to an operational amplifier 26 on a circuit board 28.

Under normal conditions, ambient light will penetrate both windows 14, 16 and be sensed by photosensitive devices 22, 24, the outputs of which will be balanced. When these balanced outputs are fed to the operational amplifier 26, no significant difference will be detected and no alarm will be sounded. When there is a flame in the environment, the ultraviolet radiation from the flame will pass through quartz window 16, causing its phosphor layer 18 to fluoresce. This, in turn, causes photosensitive device 24 to detect more light than is detected by photosensitive device 22 behind the glass window 14 which is opaque to ultraviolet radiation and whose phosphor layer 18 is not fluorescing. Hence, photosensitive device 24 will have a higher output than photosensitive device 22. This difference in outputs is detected by operational amplifier 26 and its output will cause fire detector 10 to go into the alarm condition.

In this embodiment, glass window 14, its phosphor layer 18 and photosensitive cell 22 serve to provide a reference measure of ambient light. Likewise, quartz window 16, phosphor layer 18 and photosensitive device 24 serve as an alarm activation means when ultraviolet radiation is present in the environment.

Figure 2:
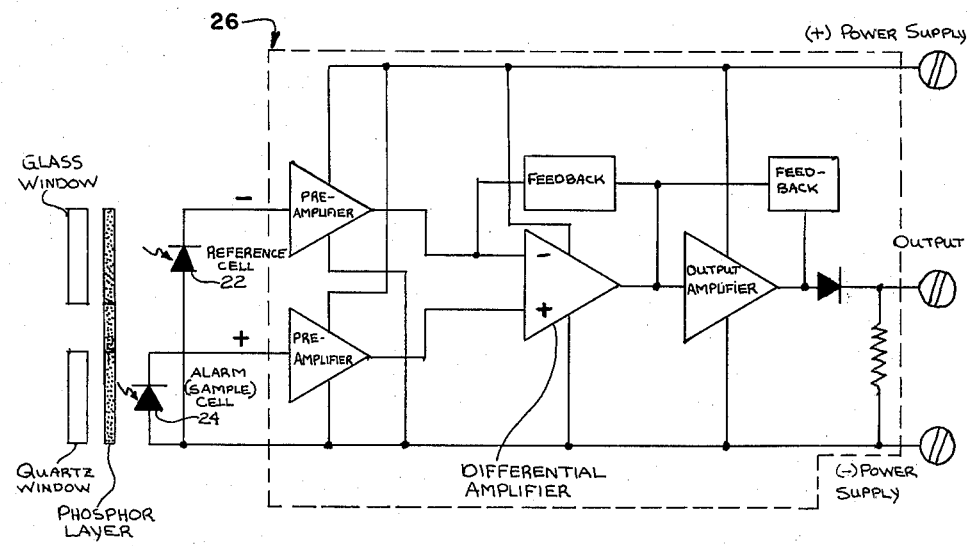
FIG. 2 is a simplified block diagram of the circuit of the ultraviolet fire detector of FIG. 1.

FIG. 2 is a partial schematic diagram of the circuit required for ultraviolet detection device 10. Operational amplifier 26 is seen to include pre-amplifier which receive input signals from their respective cells. The pre-amplifier outputs are fed to a differential amplifier and a follow-on, feed back stabilized amplifier before presentment to the output. The circuit design depicted is a typical textbook configuration for the operational amplifier employed in the alarm system. The output of operational amplifier would activate the alarm system of the fire detection system in which detector 10 is utilized.

The embodiment of FIGS. 1 and 2 uses a phosphor as a translation medium in an extremely reliable ultraviolet fire detector. The glass and quartz windows, the phosphor and the solid state photosensitive devices would have an indefinite life and require virtually no maintenance. The cost of the detector is very low, and much lower than that of a detector using a photodiode vacuum tube. The detector of this embodiment is solar blind and insensitive to environmental factors such as shock, vibration and temperature extremes. It results in improved performance, safety and reliability at a significantly lower cost.

Figure 3:
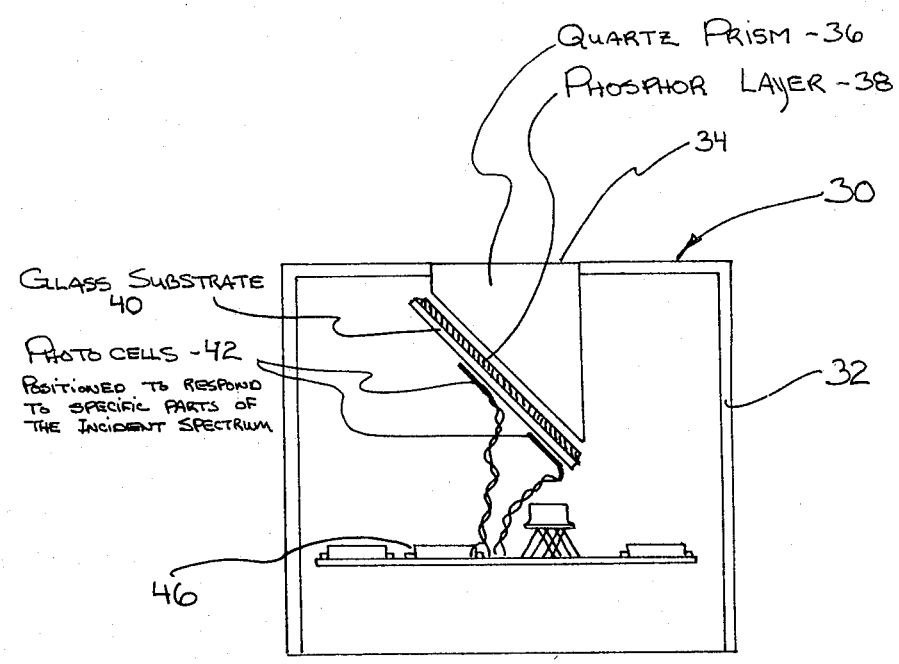
FIG. 3 is a cross-sectional view of an alternate embodiment of an ultraviolet fire detection device incorporating the principles of the present invention.

FIG. 3 illustrates an alternate embodiment of ultraviolet detector of FIG. 1, using a more sophisticated optical system and providing a more sophisticated detection of different kinds of fires. In the cross-sectional view of FIG. 3, ultraviolet fire detector 30 includes a housing 32 having a window opening 34. Window opening 34 is fitted with a quartz prism 36, or any other diffraction medium, to separate wavelengths of light and to project these wavelengths of light onto a phosphor coated screen 38, which may be a layer of phosphor on a glass substrate 40. The prism 36 may be behind slots in an opaque light barrier. The incident light coming into the prism 36 is separated by wavelengths so that only certain wavelengths are selected. A plurality of photosensitive solid state cells 42 are positioned behind the phosphor layer 38 on the glass substrate 40. Each photocell 42 is positioned to detect a different wavelength as translated by the phosphor layer 38. Those photocells 42 located behind the locations in the prism which transmit ultraviolet wavelengths will detect the fluorescence of the phosphor in various degrees. By comparing the outputs of these cells 42 in the operational amplifier 26 (FIG. 2), the detector 30 can differentiate between hydrogen and propane or butane fires. The hydrogen fire will have no carbon fluorescense in its spectrum, whereas the butane and propane fires will have carbon fluorescense in the ultraviolet range. The operational amplifier 26 uses a threshold effect in this discrimination. This discrimination has the further utility of providing a means to select a fire extinguishing agent based on the type of fire detected.

Both embodiments described and illustrated utilize solid state devices to detect ultraviolet light of specific frequencies by the use of a phosphor to translate the wavelength of the ultraviolet end of the spectrum down to a wavelength in the visible part of the spectrum. Both embodiments ignore changes in the basic ambient light from day to night by use of either a reference cell or a threshold cell. When ultraviolet light is present in the environment caused by the flame of a fire, the light impinging on the sampling cell will be enhanced by emissions from the phosphor. This enhancement yields a higher output on one of the photosensitive cells which is detected by the operational amplifier and converted by conventional electronics into an alarm signal.

While I have described and illustrated two embodiments of my invention, many others will be obvious to those skilled in the art. My invention includes all embodiments coming within the scope of the following claims.

I claim:

1. An ultraviolet fire detection device for the detection of ultraviolet emissions from a fire in the environment comprising:
   a housing having a plurality of windows therein, said windows positioned for exposure to the fire hazard area;
   at least one of said windows being a translucent panel which is opaque to ultraviolet emissions;
   at least one of said windows being a translucent substance which is transparent to ultraviolet emissions;
   at least one phosphor coated surface disposed within said housing and inwardly of the side of said windows facing the fire hazard area, said phosphor coated surface fluorescing when ultraviolet emissions impinge thereon;
   solid state photosensitive detection cells positioned behind said phosphor coated surface and aligned behind each of said windows;
   said photosensitive cells responsive to the light emanating from the fluorescing phosphor coated surface;
   electrical means for comparing the output of a cell disposed behind a window opaque to the ultraviolet emissions and a cell disposed behind a window which is transparent to ultraviolet emissions, said electrical means sounding an alarm when ultraviolet emissions are present.

2. The ultraviolet fire detection device of claim 1 wherein said first window is a sheet of glass.

3. The ultraviolet fire detection device of claim 1 wherein said second window is a sheet of quartz.

4. The ultraviolet fire detection device of claim 1 wherein said phosphor fluoresces when exposed to ultraviolet emissions ranging from 220 nanometers to 290 nanometers, and the fluorescent phosphor emits a visible glow having a wavelength of 500 to 650 nanometers.

5. The ultraviolet fire detector of claim 1 wherein said photosensitive cell is a silicon photovoltaic cell.

6. The ultraviolet fire detector of claim 1 wherein said photosensitive cell is a cadmium selenide cell.

7. An ultraviolet fire detector comprising;
   a housing having at least one window exposed toward a fire hazard area;
   said window being transparent to ultraviolet and visible ambient light;
   means to separate the ultraviolet light and the visible ambient light entering said window;
   means to measure the ambient visible light entering said window as a reference;
   phosphor coating means to translate the ultraviolet light entering said window into visible wavelengths;
   means to measure the intensity of the combined ultraviolet and ambient light;
   means to compare the combined ultraviolet and ambient light with the measured ambient light.

8. An ultraviolet fire detection device comprising:
   a housing having at least one window positioned toward the fire hazard area to be protected;
   diffraction means transparent to light in the ultraviolet and visible ranges of the spectrum constituting said window whereby ultraviolet and visible light may enter said housing and be separated according to wavelengths;
   a phosphor coating behind said diffraction means which emits light when impinged by ultraviolet radiation;

at least one photosensitive device behind said coating to measure the intensity of light impinging on said coating, whereby said photosensitive device will have a higher output when ultraviolet radiation impinges said coating than when normal ambient light impinges said coating;

an operational amplifier which compares outputs of said photosensitive cell and activates an alarm signal when the output of said photosensitive device exceeds a threshold level.

9. The ultraviolet fire detector of claim 8 wherein said diffraction means is a quartz prism.

10. The ultraviolet fire detector of claim 8 wherein said diffraction means is a diffraction grating.

11. The ultraviolet fire detector of claim 8 further including a plurality of photosensitive devices positioned at various locations behind said diffraction means to detect varying wavelengths of ultraviolet and visible ambient light.

12. The ultraviolet fire detector of claim 12 wherein one of said photosensitive devices measures only ambient visible light wavelengths and serves as a reference cell.

13. The ultraviolet fire detector of claim 12 wherein a plurality of said photosensitive cells are positioned behind said diffraction means to detect various wavelengths of ultraviolet light emanating from flames of various types of combustible substances such that the differing outputs of each detector will enable the operational amplifier to activate a fire extinguishing system having the fire extinguishing agent appropriate for the type of fire detected.

14. The ultraviolet fire detector of claim 8 wherein said photosensitive device is a photovoltaic cell.

15. The ultraviolet fire detector of claim 8 wherein said photosensitive device is a cadmium selenide cell.

16. The ultraviolet fire detector of claim 8 wherein said coating serves to translate ultraviolet wavelengths into visible wavelengths by eminating a visible light when impinged by ultraviolet radiation.

* * * * *